US012769500B2

(12) United States Patent
Menas et al.

(10) Patent No.: US 12,769,500 B2
(45) Date of Patent: Oct. 20, 2026

(54) COMPUTER-IMPLEMENTED METHOD FOR PROVIDING REMOTE SUPPORT

(71) Applicant: TeamViewer Germany GmbH, Göppingen (DE)

(72) Inventors: Massinissa Menas, Kirchheim unter Teck (DE); Johanna Reiting, Uhingen (DE); Sascha Sanzenbacher, Korntal-Münchingen (DE); Paul Schanz, Kornwestheim (DE); Andreas Schiedl, Esslingen (DE)

(73) Assignee: TEAMVIEWER GERMANY GMBH, Göppingen (DE)

( * ) Notice: Subject to any disclaimer, the term of this patent is extended or adjusted under 35 U.S.C. 154(b) by 0 days.

(21) Appl. No.: 18/942,316

(22) Filed: Nov. 8, 2024

(65) Prior Publication Data

US 2025/0156134 A1 May 15, 2025

(30) Foreign Application Priority Data

Nov. 9, 2023 (DE) ..................... 10 2023 131 204.9
Feb. 7, 2024 (EP) .................................... 24156248

(51) Int. Cl.
*G06F 3/14* (2006.01)
*G06F 3/0488* (2022.01)
(Continued)

(52) U.S. Cl.
CPC .......... *G06F 3/1454* (2013.01); *G06F 3/0482* (2013.01); *G06F 3/04842* (2013.01);
(Continued)

(58) Field of Classification Search
CPC ...... G06F 3/1454; G06F 9/452; G06F 3/0482; G06F 3/04842; G06F 3/0488; H04N 21/41407; H04N 21/4316; H04L 67/025
See application file for complete search history.

(56) References Cited

U.S. PATENT DOCUMENTS 9,247,029 B1 * 1/2016 Jia ........................... G06F 9/452
10,445,051 B1 10/2019 Subash
(Continued)

FOREIGN PATENT DOCUMENTS

EP 2509292 A1 * 10/2012 .......... G06F 3/0237

OTHER PUBLICATIONS

European Search Report cited in corresponding European patent application No. 24156248.7; Jul. 15, 2024; 10 pp.

*Primary Examiner* — Douglas Wilson
(74) *Attorney, Agent, or Firm* — Lempia Summerfield Katz LLC

(57) ABSTRACT

A computer-implemented method for providing remote-support for a remote device with a local device includes providing the remote device having a remote screen, providing the local device having a local screen, and providing a communication channel between the remote device and the local device. The method also includes transmitting at least a part of a content of the remote screen as a remote content via the communication channel from the remote device to the local device and displaying the remote content on the local screen. The method also includes receiving user inputs on the local device in relation to the remote content and re-displaying at least part of the remote content in an app window on the remote device.

19 Claims, 23 Drawing Sheets

(51) Int. Cl.

| | |
|---|---|
| ***H04L 67/025*** | (2022.01) |
| ***H04N 21/414*** | (2011.01) |
| ***H04N 21/431*** | (2011.01) |
| *G06F 3/0482* | (2013.01) |
| *G06F 3/04842* | (2022.01) |
| *G06F 9/451* | (2018.01) |

(52) U.S. Cl.
CPC ............ *G06F 3/0488* (2013.01); *G06F 9/452* (2018.02); *H04L 67/025* (2013.01); *H04N 21/41407* (2013.01); *H04N 21/4316* (2013.01)

(56) References Cited

U.S. PATENT DOCUMENTS

| | | | | |
|---|---|---|---|---|
| 10,484,437 | B2 | 11/2019 | Bányai | |
| 2020/0133694 | A1* | 4/2020 | Bosnjakovic | H04L 65/764 |
| 2022/0057923 | A1* | 2/2022 | Haizmann | G06F 3/04847 |
| 2024/0192910 | A1* | 6/2024 | Bindouski | G06F 3/1454 |
| 2024/0320795 | A1* | 9/2024 | Yajima | G06T 11/60 |

* cited by examiner

User interactions

Scenario

*After a TeamViewer connection is established with QuickSupport and PiP is enabled, the supporter navigates the supportee to and through the Settings app to help the user enter their Wi-Fi password.*

Fig. 9

User interactions

Scenario

1. Swipe upwards to get to the home screen
2. If the 'Settings' app is not visible: Swipe left and right through the home screen
3. Tap on 'Settings'
4. Tap on 'WLAN
5. If WLAN is deactivated: Activate by tapping the toggle button
6. If there is a long list of networks: Swipe down until the desired WLAN is found
7. Select network by tapping
8. Enter WLAN password
9. Tap the 'Connect' button

Fig. 10

➡ Tap & swipe

TeamViewer

Procedure

Breakdown of the implementation steps

1. Play random video in PiP
2. Play back screen content in PiP
3. Receive command for marking
4. Display marker in the correct position TeamViewer Implementation 21

Fig. 13

Command for marker Receive

- Custom command created specifically for feature - Parameters: Gesture type, X-coordinate, Y-coordinate
- Click in view with iOS screen is captured
- Command is sent from the client side (macOS)
- Command is received from the server side (iOS)

TeamViewer Implementation 24 macOS TeamViewer Full Client

- Buttons for selecting the gestures
- Command is sent to iOS after clicking on the transferred iOS screen macOS implementation

- Unclean architecture for transmission of the selected button
- Existing code used for remote control
- Also code in deeper layers had to be adapted.

iOS TeamViewer QS

Marking images

- No specially designed images used for feature
- Previous gesture is displayed for a short time
- "Offset" hard-coded for marking images
- Images can be cut off at the edge when clicked

COMPUTER-IMPLEMENTED METHOD FOR PROVIDING REMOTE SUPPORT

CROSS-REFERENCE TO RELATED APPLICATIONS

This application claims the benefit of and priority to earlier German Application No. 10 2023 131 204.9 filed Nov. 9, 2023 and European Application No. 24156248.7 filed Feb. 7, 2024. The entire disclosures of these earlier filed applications are hereby incorporated by reference as if fully set forth herein.

BACKGROUND

1. Technical Field

The present disclosure relates to the problem of providing remote-support for a remote electronic device, for example a hand-held tablet-computer, with a local electronic device, for example a computer. The technical concepts of the disclosure are particularly useful if the operating system of the remote electronic device does not allow third party software to control input and/or output resources of the remote device, for example to control another software.

2. Description of the Prior Art

During the last decades, a significant increase in the number of electronic devices such as computers, smartphones, hand-held tablets and so-called IoT-devices has been observed around the world. There is also a growing interest in using local electronic devices to provide remote-support for other remote electronic devices. For example, a third-party software manufacturer may provide remote-support for its software by directly interacting with the remote electronic device of the customer.

Several existing products, such as TeamViewer®, allow users to remotely control a remote device from a local device. After the user has installed a program on both devices, the user can remotely control, for example, his desktop computer at home from his smartphone and access the files, pictures, applications and programs stored on the computer from the mobile device. Usually, the screen of the local device displays a complete or partial copy of the content that is displayed on the screen of the remote device and the user may interact with all the graphical user interface components as if the user is sitting in front of the remote device.

To this purpose user inputs from input resources, like e.g. keyboard events or mouse events, from the local device are transferred via a communication channel to the remote devices. On the remote device, these commands are executed as if they had been input at the remote device. This gives the user the feeling as if he was looking at the screen of the remote device and as if he is working locally on the remote device.

It is also possible to provide somebody else, for example an IT specialist, i.e., the so-called supporter, with an access to one's own device for repair or maintenance work on the software running on that device.

However, the operating system of the remote device might disallow a third-party software to interact with the input resources such that the third-party software may not be able to control other parts of the operating system or other software outside its own sandbox or screen window. This is, for example, the case for iOS or iPodOS.

In such cases, the supporter has no possibility to control the remote device. He can only see the screen of the supported user's device. To this end, even such highly closed and secured operating systems often allow a so-called screen broadcast. The supporter may then provide instructions how to proceed to the supported user via a parallel video conferencing session.

SUMMARY

It is therefore an object of the present disclosure to provide a computer-implemented method, which allows to improve the support situation for operating systems that do not allow to provide control inputs to components outside a remote support software. In particular, a better guidance for the supported user shall be achieved.

In accordance with the present disclosure, this object is achieved by a computer-implemented method for providing remote-support for a remote device with a local device, comprising the following steps:

a) providing the remote device having a remote screen;
b) providing the local device having a local screen;
c) providing a communication channel between the remote device and the local device;
d) transmitting at least a part of a content of the remote screen as a remote content via the communication channel from the remote device to the local device and displaying the remote content on the local screen;
e) receiving user inputs on the local device in relation to the remote content; and f) re-displaying at least part of the remote content in an app window on the remote device.

The applicant has realized that one may provide better remote support even in situations where the operating system does not allow third party software to provide user inputs to other components of the system and/or other installed software.

To this end, the main idea of the disclosure is to provide computer-implemented methods which display to a supported user on a remote device his/her own screen content or parts thereof (by re-displaying the already present content), wherein a supporter using a local device can equally see the remote screen content and provide guidance with respect to the content.

Apart from the latency of the communication channels and the overall system performance, the remote content is re-displayed to the remote device in real time. Therefore, both the supporter and the supported user may interact within the remote support session based on actual content.

In the simplest guidance, the supporter may then use user inputs on the local device to zoom a view port, namely what is displayed of a larger content, of the remote content re-displayed on the remote device. By this the supporter may guide the supported user towards relevant areas of the real remote screen, e.g. by zooming on certain configurations option in the re-displayed content.

However, according to an embodiment, a representation of the user inputs received on the local device may be displayed together with the part of the remote content in the app window on the remote device.

The supporter may then provide user inputs with respect to the remote screen content and a representation of these user inputs of the supporter are then displayed together with the remote screen content on the screen of the remote device. For this purpose, an app window is used, in which the remote screen content is displayed together with a visual representation of the user inputs. The supported user is then able to mimic the user inputs he sees in the context of his own remote content on his/her own device.

Even though other representations, like sounds, could be imagined, a visual representation of the user inputs may be advantageous.

According to an embodiment, the representation of the user inputs displayed on the remote device comprises a position marker showing located user inputs, such as mouse events and/or touch gestures.

With electronic devices using screens, many user inputs are located in a sense that the user input is related to a certain location of a screen which shows a graphical user interface (GUI). Such located user inputs are for example mouse events like movements, mouse clicks, pen touches, finger gestures, drag-and-drop gestures and the like. Therefore, it may be highly advantageous to provide a marker at a location within the re-displayed remote content which corresponds to the location of the user input on the local device. This becomes possible, because the user inputs on the local device are received in relation to the remote content (such as localized within the remote content) transmitted from the remote device.

For a better visibility, the marker may be animated to represent user inputs, such as activating gestures. For example, a mouse click could be translated to a flashing (like shrinking and inflating) pointer or blinking circles centred around a screen content position.

According to an embodiment, the representation of user inputs comprises text representing keyboard inputs.

Usually, the operating systems which do not allow control to other components or third party applications, still allow to supply content to the clipboard of the system. The clipboard function or component of an operating system allows to copy data, often text, from one application to another. Therefore, known remote support software has the possibility to transmit textual user input from the local device to the remote device. The remote support software running on the remote device may then copy the text, e.g. a complicated CLI command, into the clipboard of the system. The supported user may then use the clipboard to copy this text, namely the CLI command, at the appropriate command line.

However, in situations where even the clipboard function is restricted, a visual representation of the text inputs, e.g. in form of a subtitle to a video stream, is advantageous.

According to an embodiment, the app window can be a picture-in-picture player partially overlaying the content of the first screen.

Generally, the app window may be provided as a standard application window which may be placed next to, over and/or underneath other app windows in a multi-window operating system, like e.g. Microsoft Windows or MacOS. However, using a picture-in-picture (PIP) player as an app window for displaying the remote content on the remote device is particularly useful for the present disclosure, because a PIP player is often implemented as an app window hovering above other screen content. The PIP player may be configured to always stay on top of other windows.

According to an embodiment, the displaying of the remote content on the remote device comprises displaying the remote content in a split-screen configuration together with the remaining content of the remote screen.

Instead of placing the app window within the remote screen, the split-screen configuration allows to place the app window below, above or next to the remaining content of the remote screen. In an example, single window operating systems sometime provide a possibility to configure an app window together with the remaining screen content in a split-screen configuration. Displaying the app window on a second physical screen like a second monitor can also be seen as a split-screen configuration.

According to an embodiment, the remote content re-displayed in the app window is only a partial section of the content of the remote screen and wherein the partial section follows or centers a localized user input received on the local device.

This provides the possibility that the supported user can easily follow a mouse pointer representation or touch event representation within the app window.

According to an embodiment, the partial section executes a smooth and/or delayed movement from a position of origin towards a newly received mouse pointer or touch event position.

The supporter on the local device may use all sorts of user inputs to give guidance to the supported user. This may include all sorts of visual markers, like e.g. a highlighting feature, a pointer, a finger or the like overlaid on the screen content. The support may also select part of the content, e.g. with a rectangular region-of-interest (ROI) selection. The augmented content stream may then be changed such that everything outside the ROI selection gets darkened when displayed on the screen of the supported user.

As the broadcasted part of the screen of the supported user is usually bigger than the app window showing the augmented content stream, the possible user inputs of the supporter may also include scroll or zoom commands to direct the cut-out section of the screen shown to the supported user. Furthermore, in the case of a small app window compared to the overall size of the remote screen, it may become difficult for the supported user to see the components, links or soft buttons and the like to which the support is guiding the supported user.

Therefore, the user input may correspond to a scroll command, as a command destined for defining the position of cut-out content shown on the remote device, and/or to a zoom command which correspond to a command to decrease or increase the magnification.

For this aspect, it is particularly useful if the second screen is a touch-sensitive screen, and the user-action is a touch gesture.

According to an embodiment, for transmitting content of the remote screen a screen region comprising the app window is excluded and/or wherein a screen region comprising the app window is excluded from the re-displayed remote content.

This prohibits an infinite mirroring effect in the re-displayed content.

According to an embodiment, the excluded screen region is replaced with a predefined image, such as a manufacturer logo.

According to an embodiment, the app window is overlaid semi-transparent over other content of the remote screen.

According to an embodiment, the remote content of the remote screen is transmitted to the local device using screen broadcasting. Alternatively, or in addition, the re-displaying of the remote content comprises copying a broadcasting data stream on the remote device, augmenting this broadcasting data stream on the remote device with a representation of the user in-puts received from the local device and feeding a resulting data stream to the app window.

Generally, it would be possible to only intermittently transmit still frames whenever a user input has to be shown to the supported user. However, the content in one example is continually transmitting from the first screen to the local device.

According to an embodiment the content of the remote screen is captured during a time period when the re-displaying of the remote content is deactivated or moved to another position on the remote screen.

By this the remote content does not include its re-displayed content and therefore it is possible to remove a infinite mirror effect. For example, one may intermittently deactivate the app-window showing the re-displayed content and capture the underlying content, such as at the position where the app-window would normally be situated. This may take only a small time, such as only a single frame. Then the app-window re-displaying the remote content can be restored at its original position and the user might not even notice the capturing of the underlying content under the app-window. The deactivation of the app-window, such as the PIP player, may include closing, moving or minimizing the window. It is mainly important that the screen content normally blocked by the app-window can be seen. The captured underlying content normally underlying the app-window may be stored and provided instead of the current content at the app-window position during normal re-displaying.

According to an embodiment, the method provides means to signalize to the user of the remote device to move the app-window. This may be necessary in order to give access to GUI components underlying under the app-window. This might also be used to capture the underlying content.

According to an embodiment, the view port of the re-displayed remote content may be changed, such as zoomed, when triggered. Such a trigger might be included if the supportee does not react to a certain guidance given, e.g. does not click a certain GUI component, within a given time, or a manual trigger by the supporter. The change of the view port may include smooth zoom and/or moving sequences. The sequences may be repeated The method may also include to provide a region-of-interest input means, which allows the supporter to draw a region-of-interest within the remote content and means to adjust the view port of the re-displayed remote content to show the region-of-interest in the app-window. Again, changes may include smooth sequences of zoom in or out and moving around.

According to an embodiment, the method provides navigating indicators which provide the user of the remote devices with indications where a partial section of the remote content being re-displayed in the app window is located within the whole remote screen.

This guides the supportee, such as when the app window shows a zoomed view port. In order to get an idea, where the user of the remote is device is currently focusing, the method may track the mouse pointer, e.g. by capturing and transmitting mouse events via the communication channel or by pattern recognition within the transmitted remote content. The navigating indicators might include cursor pointer animations and/or indicator side bars, e.g. small areas at the edge of the app window showing directional indicators. For example, if the mouse pointer on the local device is far higher than the relevant section shown in the app window, a bar showing down arrows may be overlaid at the lower edge of the app window.

According to an embodiment, a text input may be shown in the app-window. For example, it might be possible to copy the text input from the app-window. This allows the supporter to provide textual commands to the supportee. For example, when using a PIP player such textual input may be provided using subtitles API.

The subject of the disclosure is also a data processing system comprising a remote device having a remote screen, a local device having a local screen and means for carrying out a method discussed above.

The subject of the disclosure is also a computer program product comprising instructions which, when executed, perform a method discussed above.

The subject of the disclosure is also a non-transitory or transitory computer-readable medium, comprising instructions which, when executed, perform a method discussed above.

A transitory computer-readable medium may be a random-access memory (RAM), while non-transitory computer-readable mediums comprise hard disc drives of a server or other computer, optical discs, read-only memories or flash memories.

Definitions

The term "device" is used herein to denote an electronic device having a processing unit and a user interface. Examples of such devices include servers, desktop or portable computers, PDAs, television sets, gaming consoles and various mobile devices such as smartphones or tablet computers.

The term "screen" as used herein includes any type of cathode ray tube or liquid crystal display, but also projection screens or screen in VR headsets.

The term "user-input" is used herein to denote any type of action that a user may perform to control an electronic device. Such user-input includes:

a) moving a mouse;
b) hitting the key of a mouse, of a keyboard or of any other peripheral input device; c) gestures on a touch-sensitive screen;
d) activating controls via speaking; or
e) gestures made with any part of the human body, e.g. gestures made with the arms, the head, the eyelids or the iris.

The terms "remote" and "local" are used herein to distinguish devices on different side of a communication channel. In this context, it is usually not of importance if the devices are located far from each other in the real world or not. Therefore, remote and local may equally refer to devices in the same room or building.

BRIEF DESCRIPTION OF THE DRAWINGS

Various features and advantages of the present disclosure may be more readily understood with reference to the following detailed description taken in conjunction with the accompanying drawings in which:

FIGS. 4-23 show presentation slides with further details regarding the inventive concept of the present disclosure.

DETAILED DESCRIPTION OF EMBODIMENTS

Figure 1:
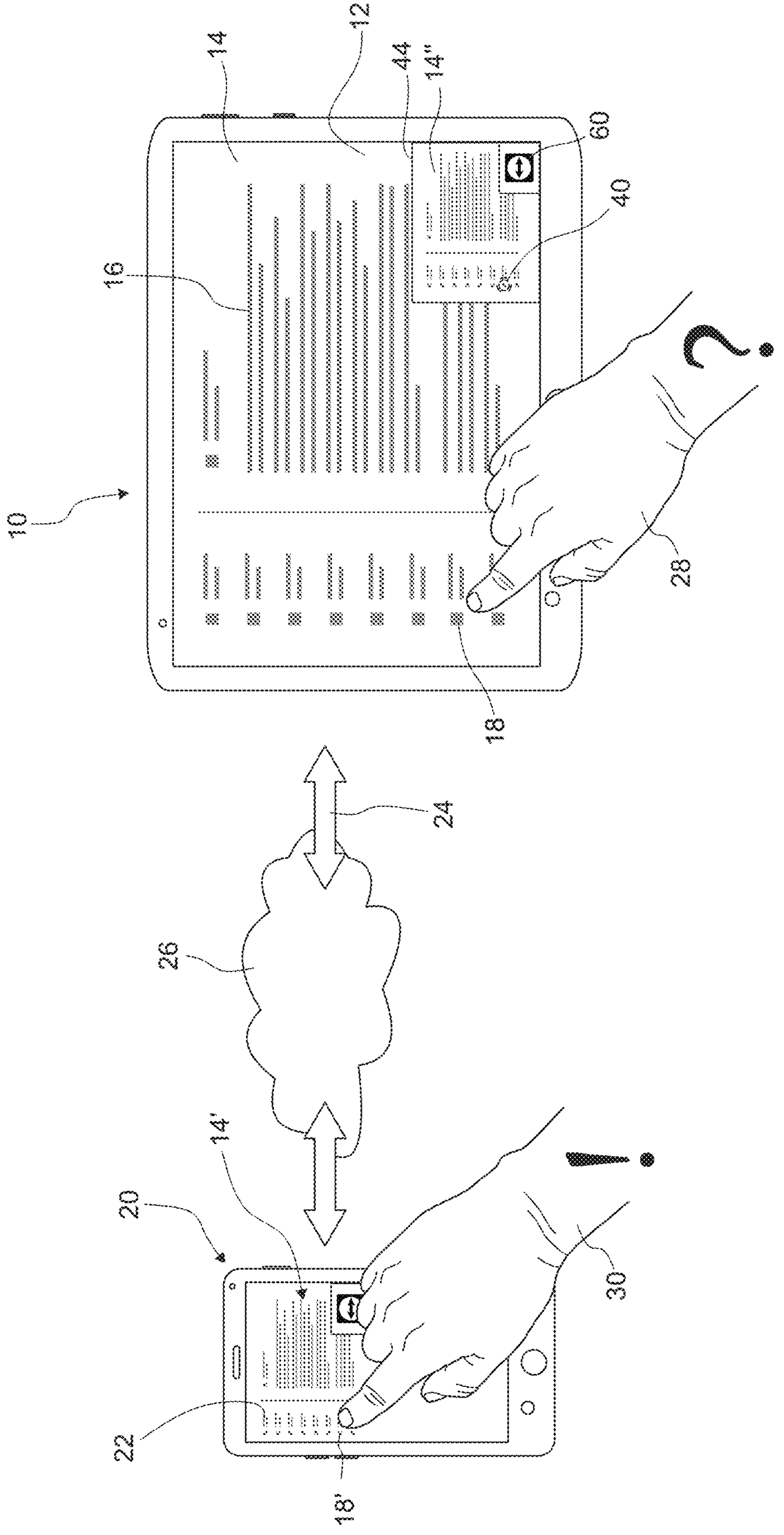
FIG. 1 shows a supported user with a tablet computer as a remote device that receives a remote support session from supporter using a smartphone as a local device, wherein selecting a given item is illustrated.

FIG. 1 shows on the right-hand side a tablet computer 10 as a remote device having a remote screen 12 on which a remote content 14 is displayed. The remote content 14 in one example comprises several lines of text 16 and soft buttons 18 which, when activated, e.g. by touching with a fingertip or a pen, trigger certain actions on the remote device, for example opening a web link or setting a certain configuration option. As a matter of course, the content 14 may also comprise graphics such as photographs or maps.

As an example of a local device, a smartphone 20 which has a local screen 22 is shown on the left-hand side of FIG. 1. Apart from the screens, the tablet computer 10 and the smartphone 20 each comprises a processing unit, a non-transitory memory and a rechargeable battery (not shown) to execute a remote support software.

It is understood that for the present disclosure any other types of local and remote devices may be used, like e.g. a personal computer, a workstation computer, embedded devices and/or any other electronic devices which include screens to display content to the user.

On the tablet computer 10 and also on the smartphone 20 a remote support software is installed and stored in the respective memory that enables to establish a remote support session between both devices.

To this end, a server typically assigns a unique ID to both devices. If a user enters the ID on the smartphone 20, the server establishes an encrypted communication channel 24 between the two devices 10, 20 via a network 26. After this communication channel has been established, the server typically withdraws his participation so that the devices 10, 20 communicate directly with one another.

In the present situation, a supported user 28 using the tablet computer 10 receives remote support from a supporter 30 using the smartphone 20.

When a remote support session is established, a copy 14' of the content 14 displayed on the remote screen 12 of the tablet computer 10 is transmitted to the smartphone 20 and also displayed on the local screen 22 of the smartphone 20. For this purpose, the content of the remote screen is transferred via the communication channel 24 to the local device. Even on operating systems which have a higher level of security related restrictions such as iOS or iPadOS this can be achieved using screen broadcast functionality included in such operating systems.

The supporter 30 then provides user inputs intended for the tablet computer 10 to his smartphone 20 e.g. by touching the screen area where the copied remote content is displayed. In FIG. 1, in one example, the supporter 30 selects the seventh soft button 18' in a list of configuration options.

The remote support software of the smartphone 20 then transmits the content 14' together with a representation 40 of the user inputs back to the tablet computer 10 as augmented content. This augmented content is presented to the supported user 28 in an app window 44 as re-displayed content 44". Therefore, the app window 44 is showing the original content 14 of the remote screen 12 as a reduced or shrunken version in a smaller area of the tablet computer 10, wherein the user inputs of the supporter 30 are visualized in this area.

The supported user 28 may then follow the guidance given with respect to his/her own screen content but shown in the app window 44 and may provide corresponding user inputs himself on the tablet computer 10. Thereby, the supported user 28 may easily cross the security barrier gap between the remote support software running on the tablet computer 10 and other software or operating system components on the same device.

In particular, the app window 44 is a picture-in-picture player which is provided as a component of the operating system. Such a picture-in-picture player (PIP player) is provided with a video stream and is often automatically floating above other application windows displayed on the screen. Also, such a PIP player is often the only possibility to provide a display area in only part of the full screen in so-called single window operating systems as for example iOS or Android.

In the present example, the representation of the finger touch of the supporter 30 in the window app 44 is a blinking animation of moving circle which are centred on the seventh soft button 18'. However, all other sorts of visual symbols may be used, like e.g. a mouse pointer, a hand with a pointing index finger and the like. It is even possible to further guide the supported user 28 with audio sounds like clicks or double-clicks.

The smartphone 20 interprets basically all user inputs made on its touch-sensitive screen 22 as commands destined for the tablet computer 10.

Figure 2A:
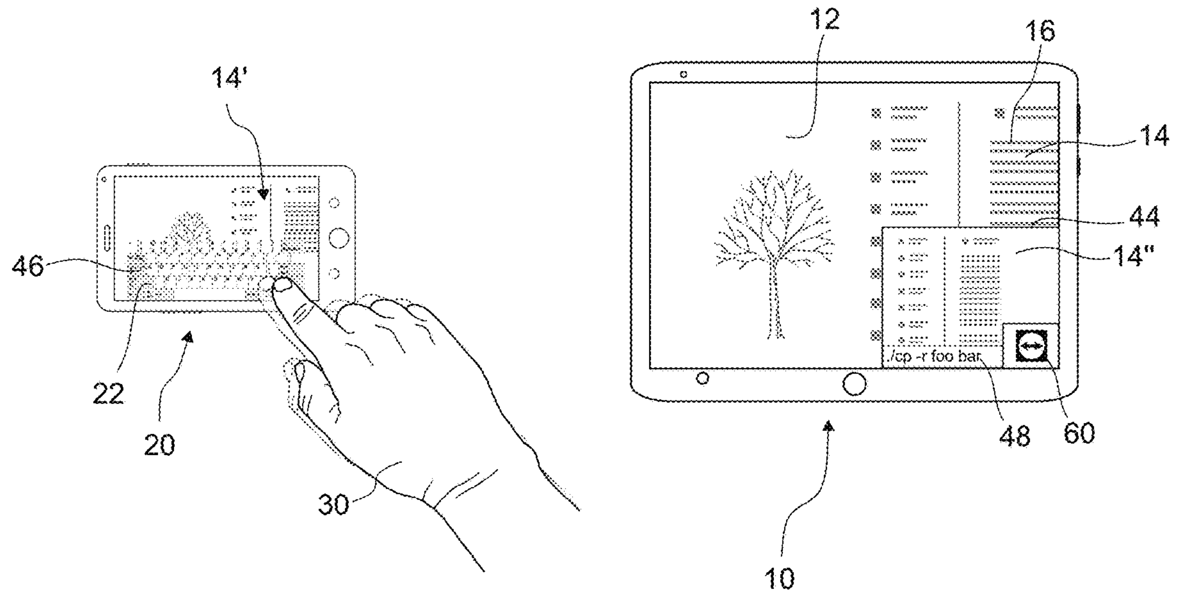
FIG. 2*a* illustrates how a cut-out section on the is following a user input of the supporter.

The physical size of app window 44 is usually much smaller than the size of the whole screen 12 of the tablet computer 10, the remote software app may show only parts of the original screen content 14 in the app window 44 as shown in FIG. 2*a*. In this example, the app window 44 only partially displays the right-hand side configuration options relevant for the support session and not the image of a tree on the left-hand side of the original content 14.

To this end, the remote support software may automatically establish a best view port for the content presented to the supported user 28 based on the location of user inputs provided by the supporter 30. E.g. the remote support software may use the coordinates of the finger touch, which was used to select a configuration option, and possibly an analysis of the copied screen content 14' for calculating a view port surrounding the selected configuration option. Or the view port may automatically follow a mouse pointer of the supporter 30 and may do so in one example with a given delay to smoothen the movement.

Furthermore, FIG. 2*a* shows an on-screen keyboard 46 on the smartphone 20. The supporter 30 may use this keyboard 46 to type in textual commands 48 destined for the table computer 10 which are displayed in the app window 44. The supported user 28 may then enter these commands 48, such as via a clipboard function, into the original command field of the tablet computer 10.

Figure 2B:
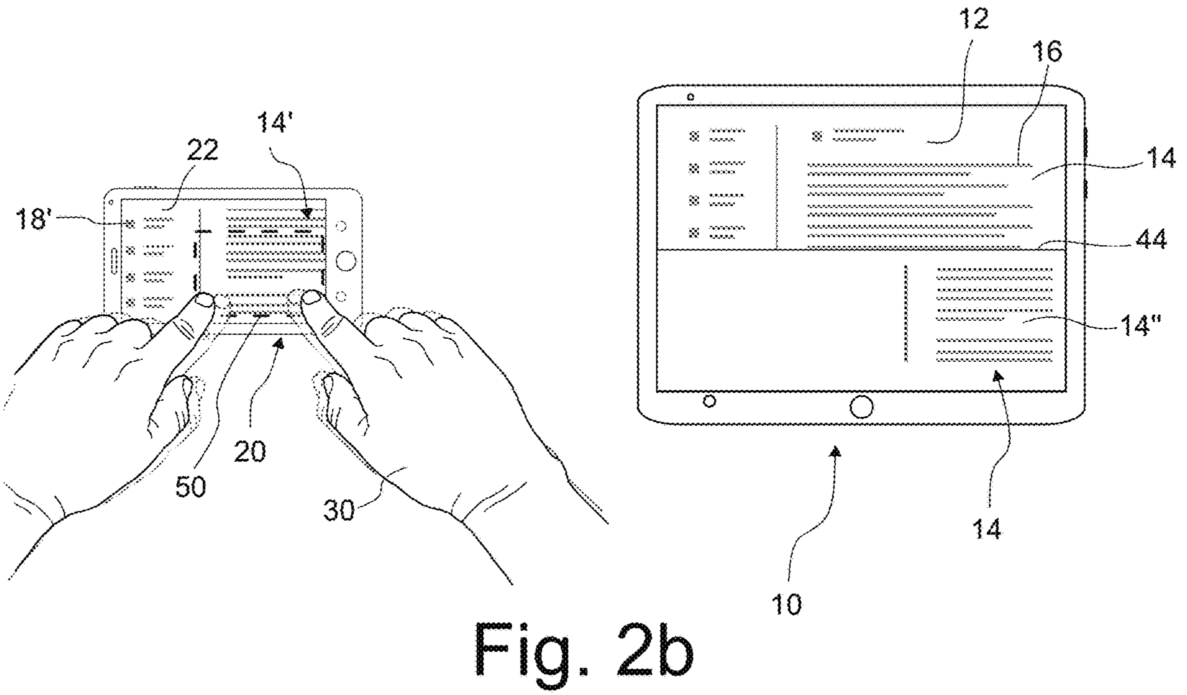
FIG. 2*b* illustrates how a zoom command on the smartphone is changing the cut-out section on the tablet computer.

Another situation is shown in FIG. 2*b*, where the supporter 30 actively zooms into a certain region of interest (ROI) 50 of the content 14' to provide the supported user with a clearly defined region of his/her screen which is currently of importance for the support session.

The supporter 30 may therefore actively guide the supported user 28 to the important part of the remote screen content.

Consequently, the content 14 of the remote screen 12 is magnified, reduced and/or cut based on user inputs on the local device and/or size changes of the app window on the remote device.

Furthermore, FIG. 2*b* shows a horizontal split-screen configuration, where the app window 44 with the augmented content, i.e., the re-displayed remote content 14" is placed below the original remote content 14.

Finally, FIGS. 1 and 2*a* show a logo 60 of the remote support software manufacturer within the re-displayed remote content 14" at the position where an image of the app window 44 would be drawn in order to avoid an infinite mirroring phenomenon. FIG. 2*b* does not need such provisions, because in the split-screen configuration the original remote content 14 is displayed next to the app window content.

Figure 3:
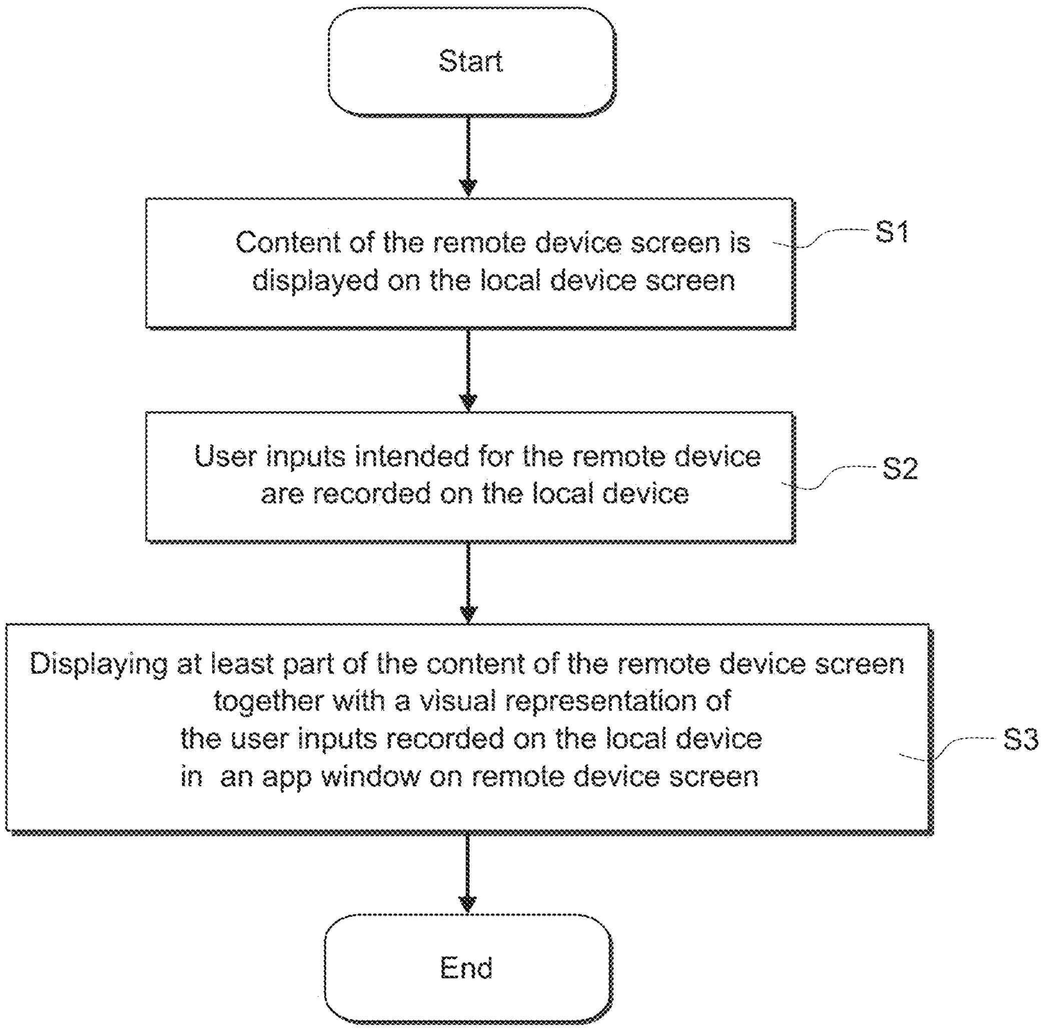
FIG. 3 is a flow diagram that illustrates important method steps in accordance with the present disclosure.
Figure 4:
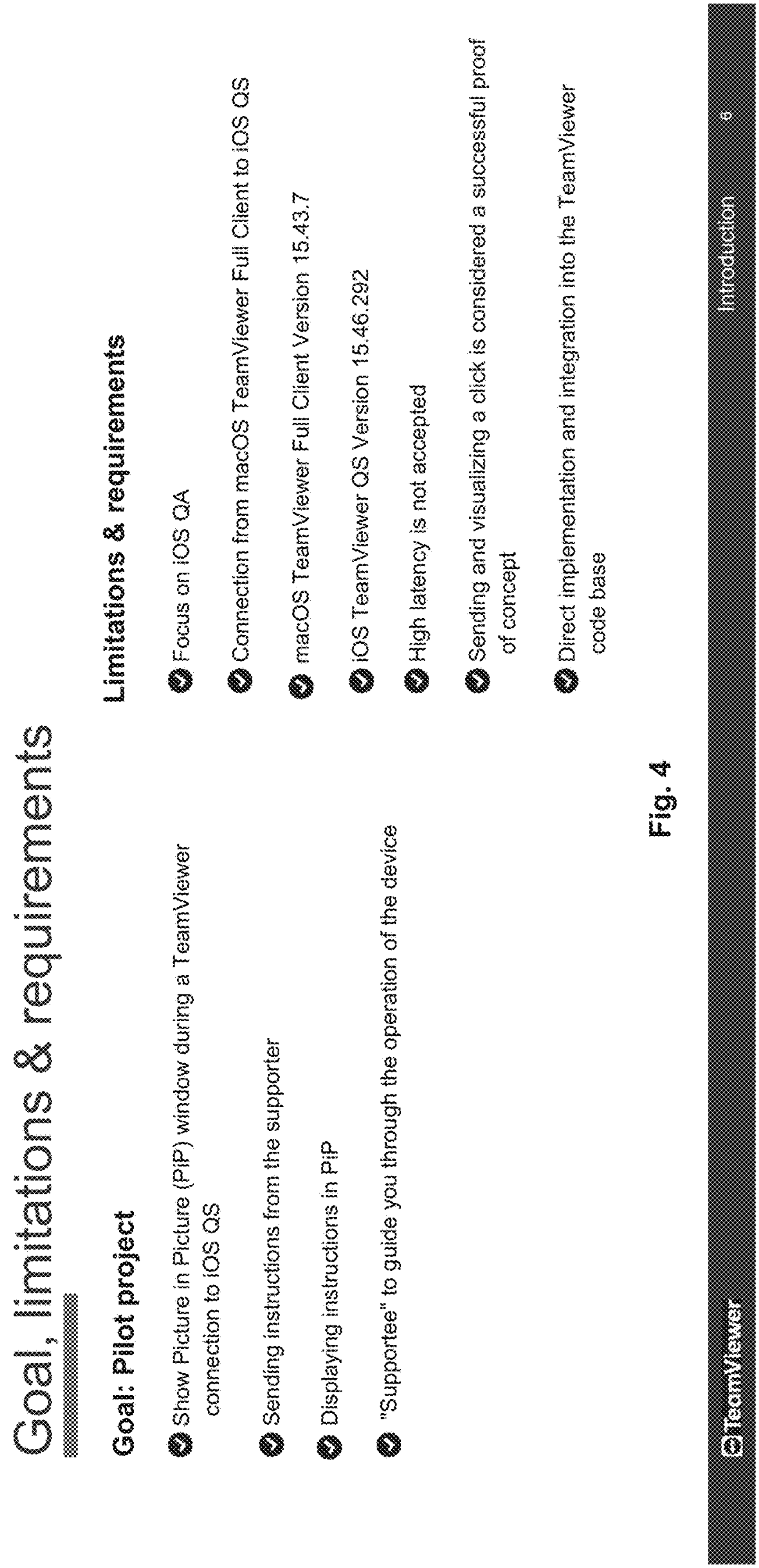
Figure 5:
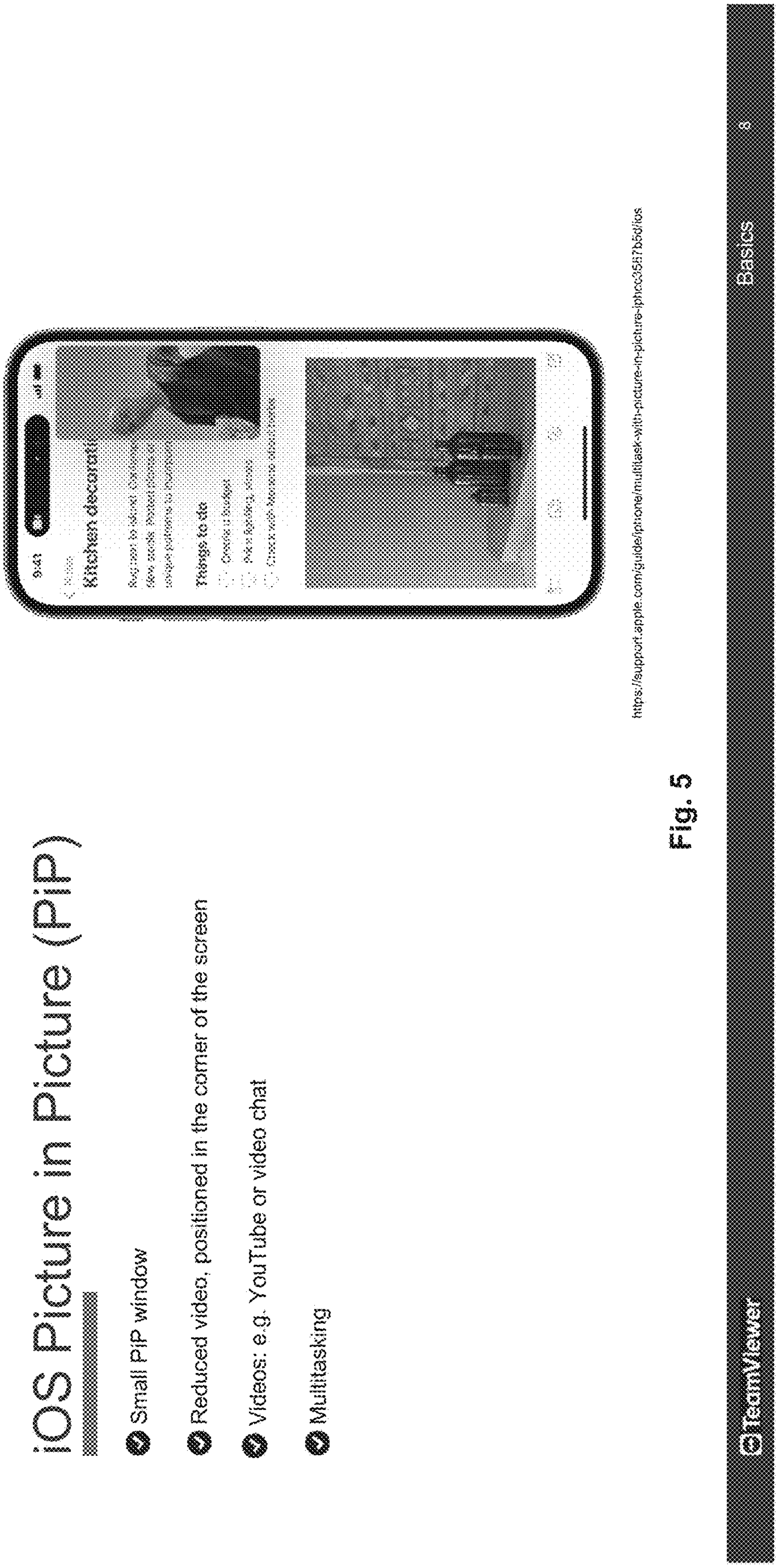
Figure 6:
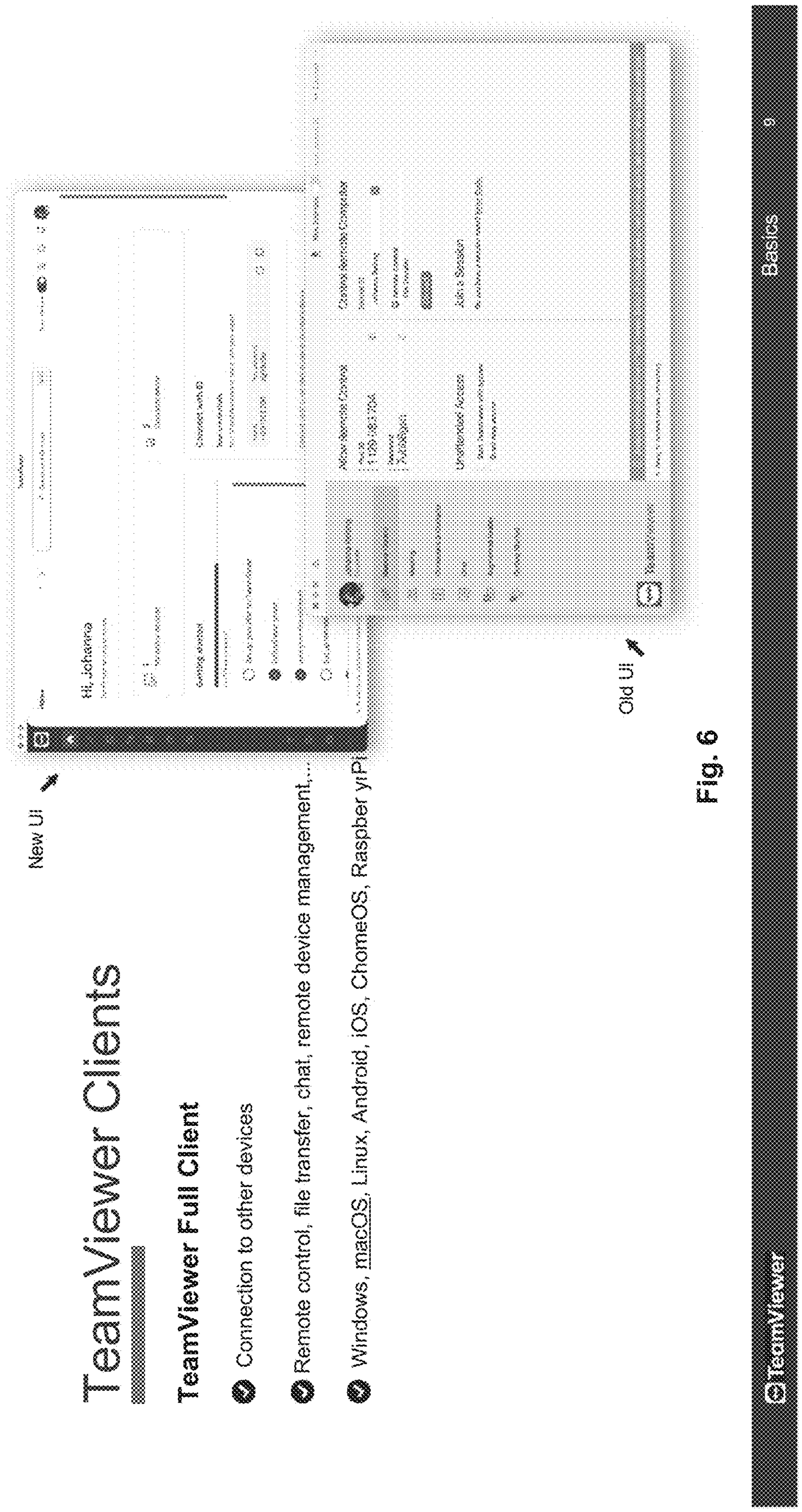
Figure 7:
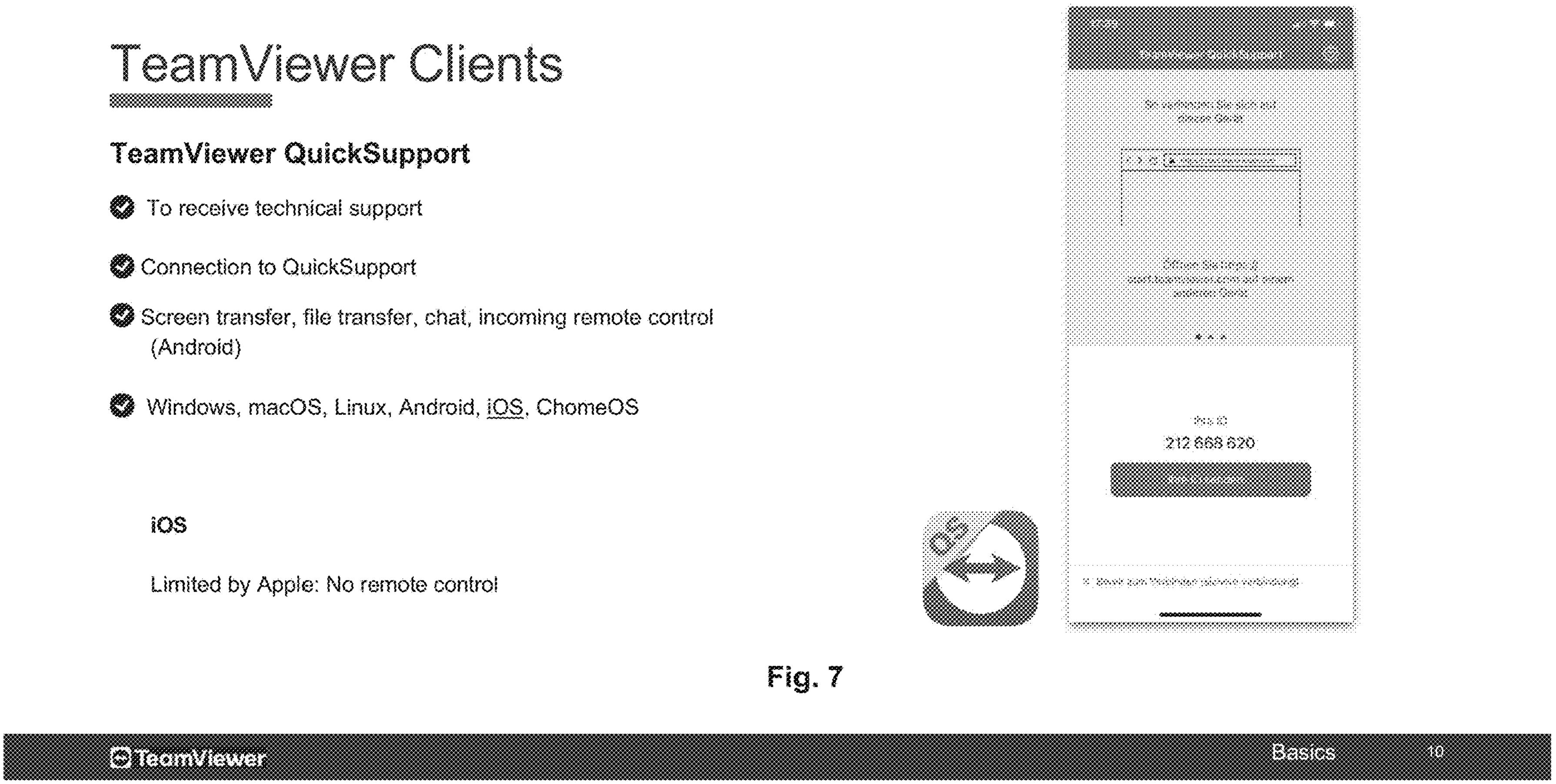
Figure 8:
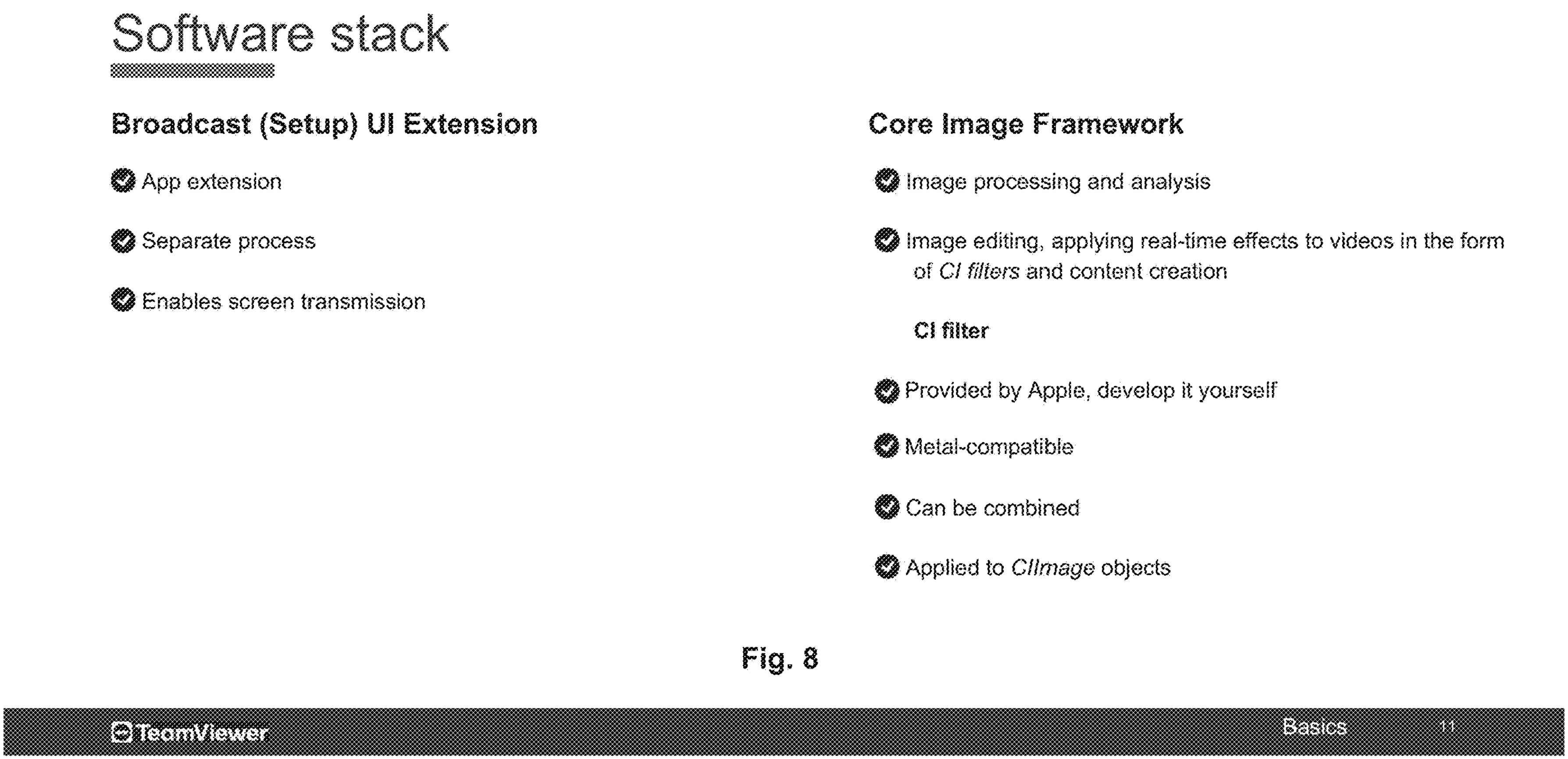
Figure 11:
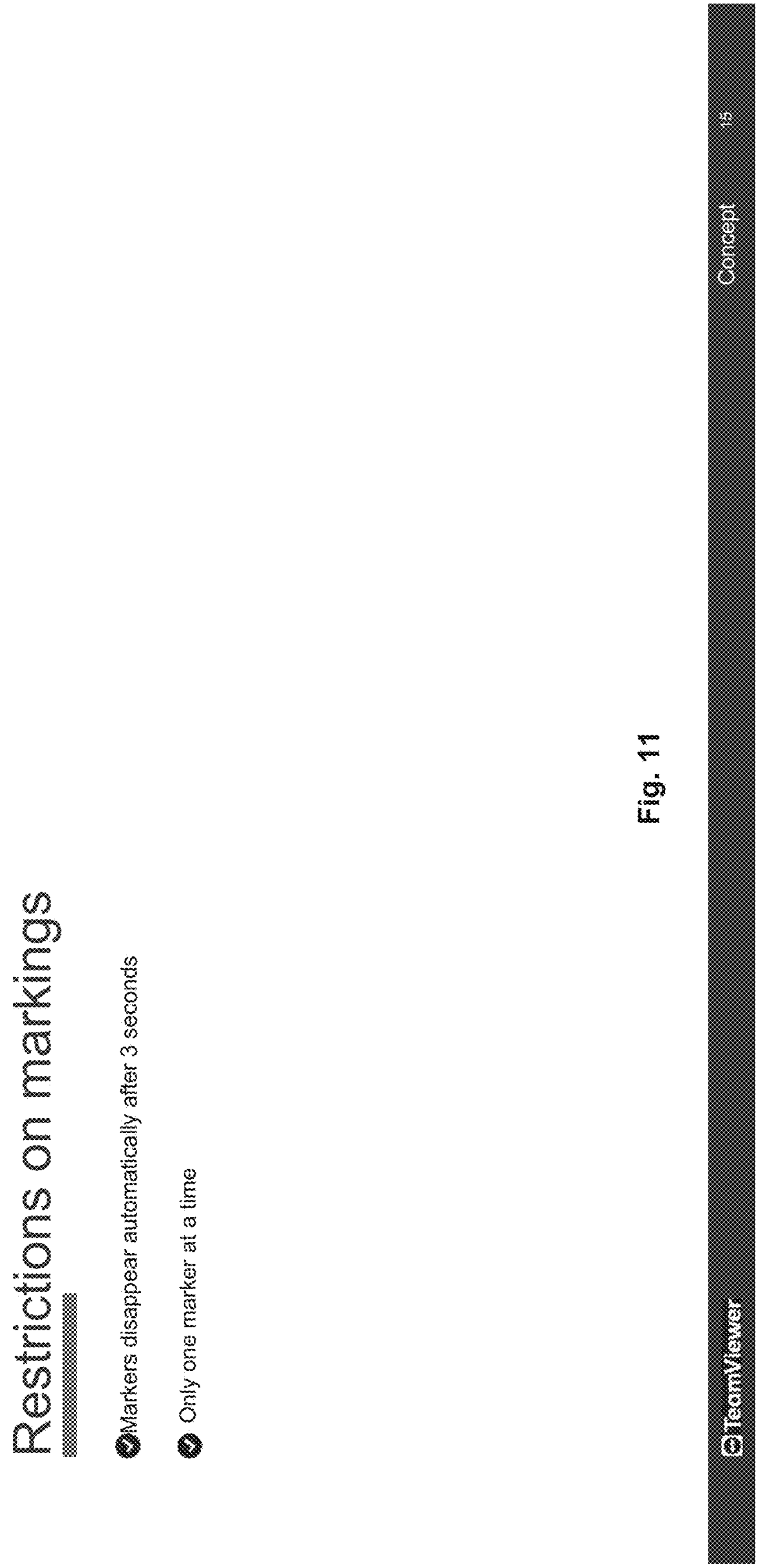
Figure 12:
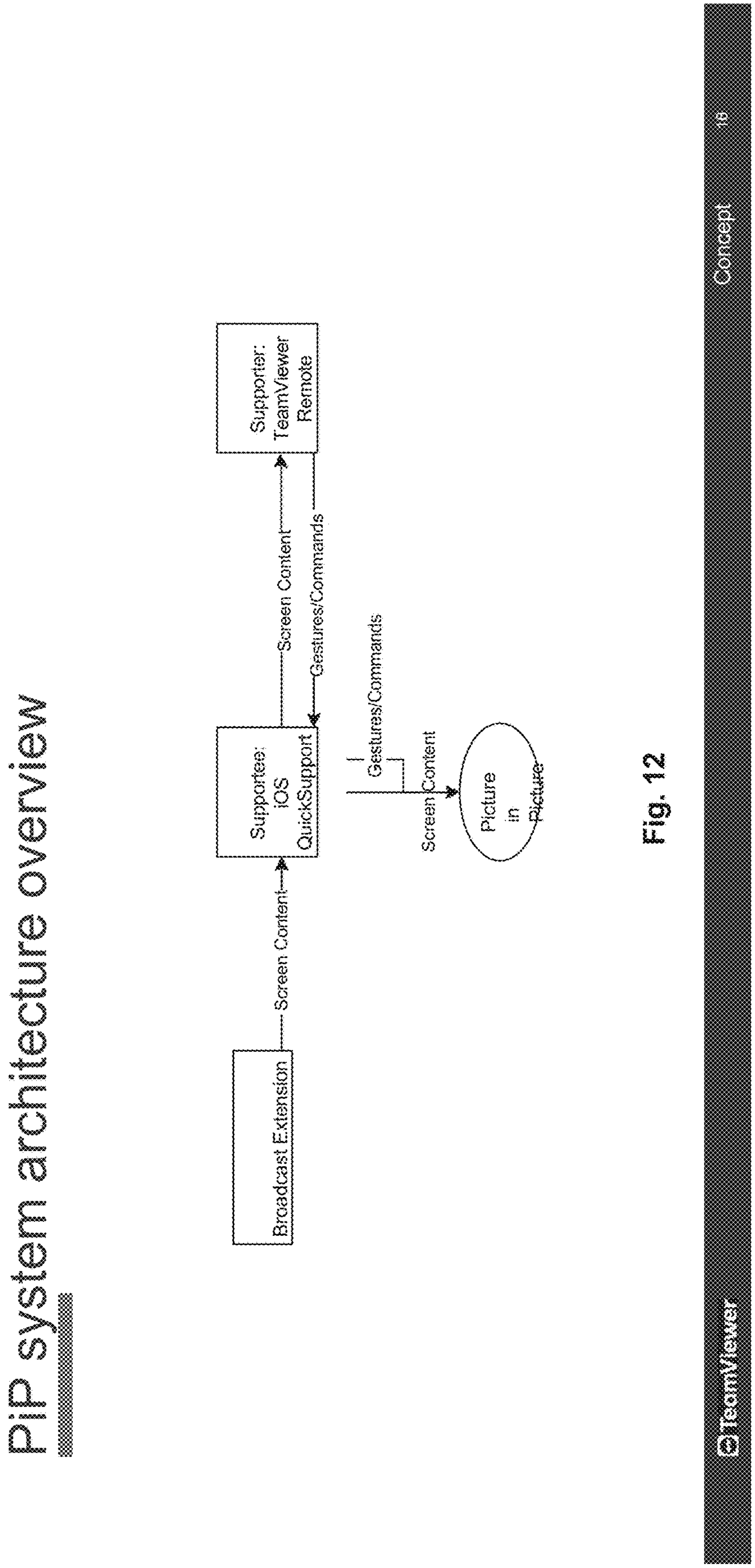
Figure 14:
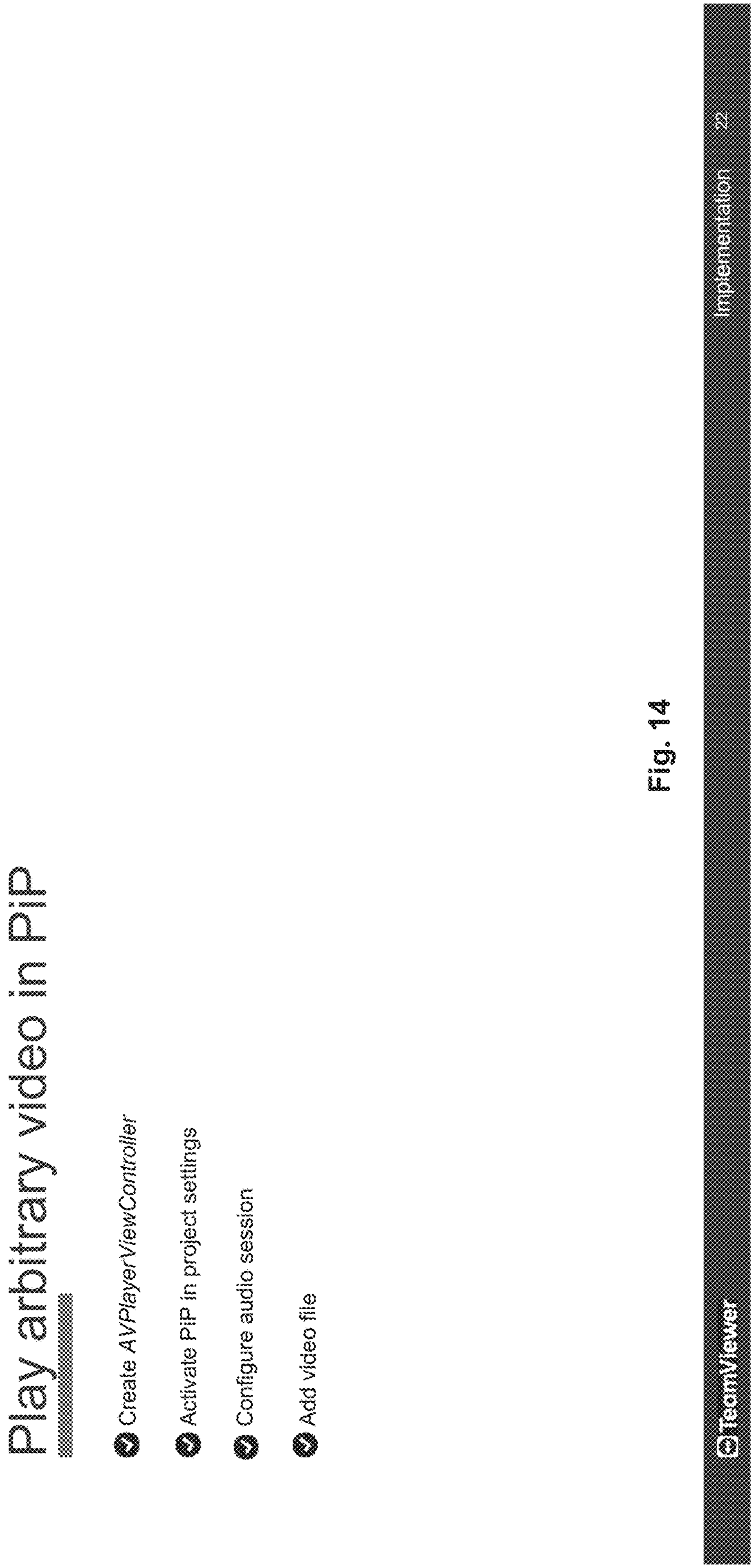
Figure 15:
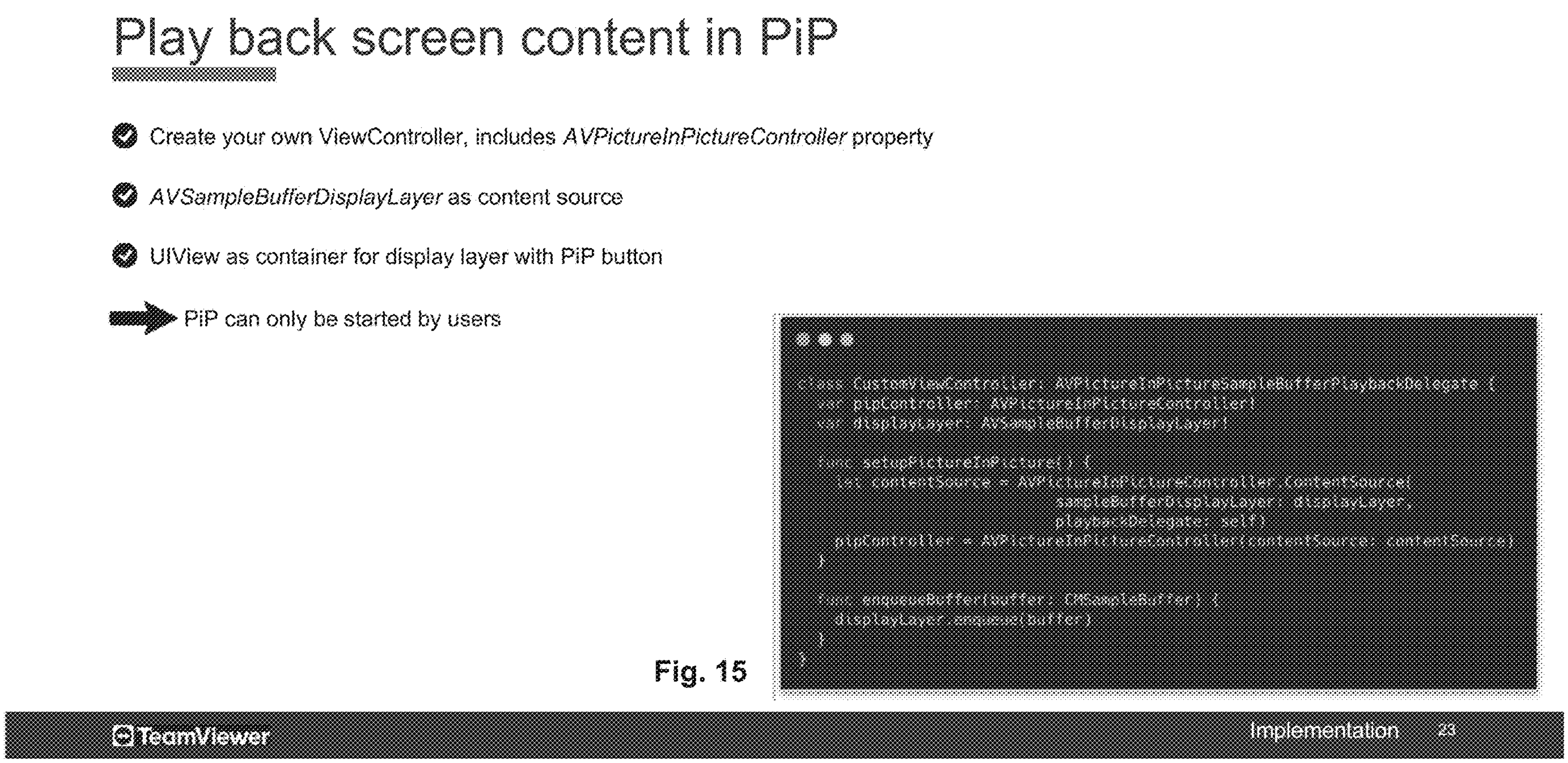
Figure 16:
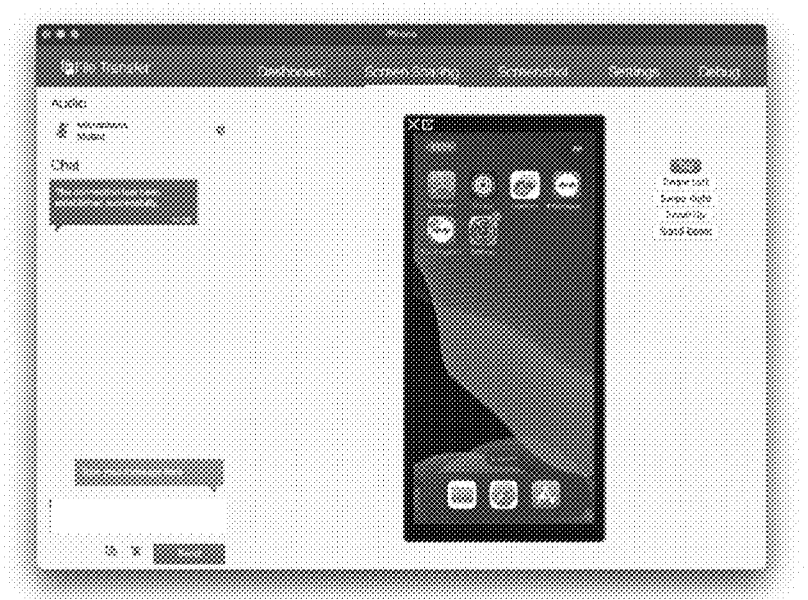
Figure 17:
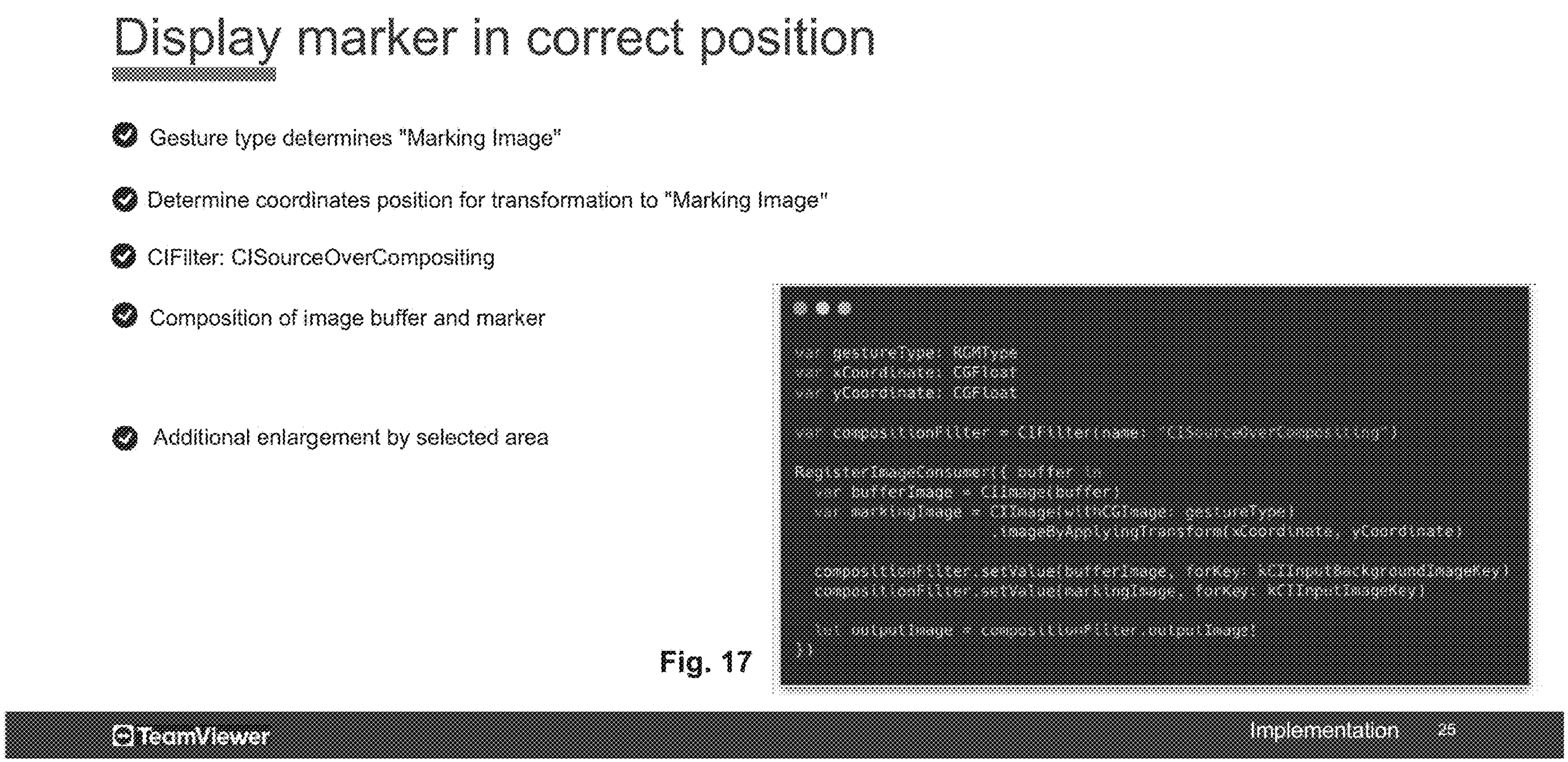
Figure 18:
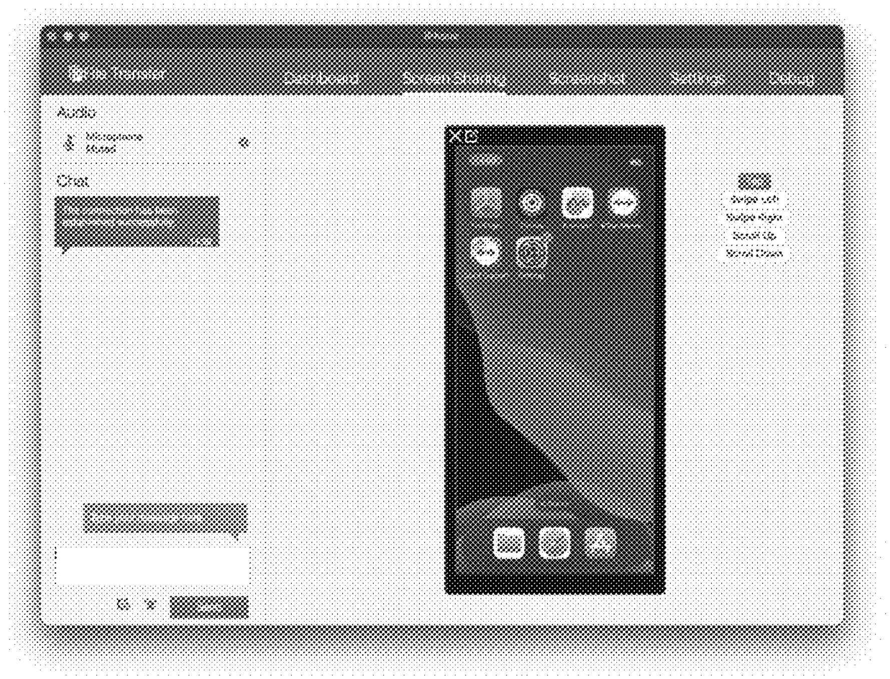
Figure 19:
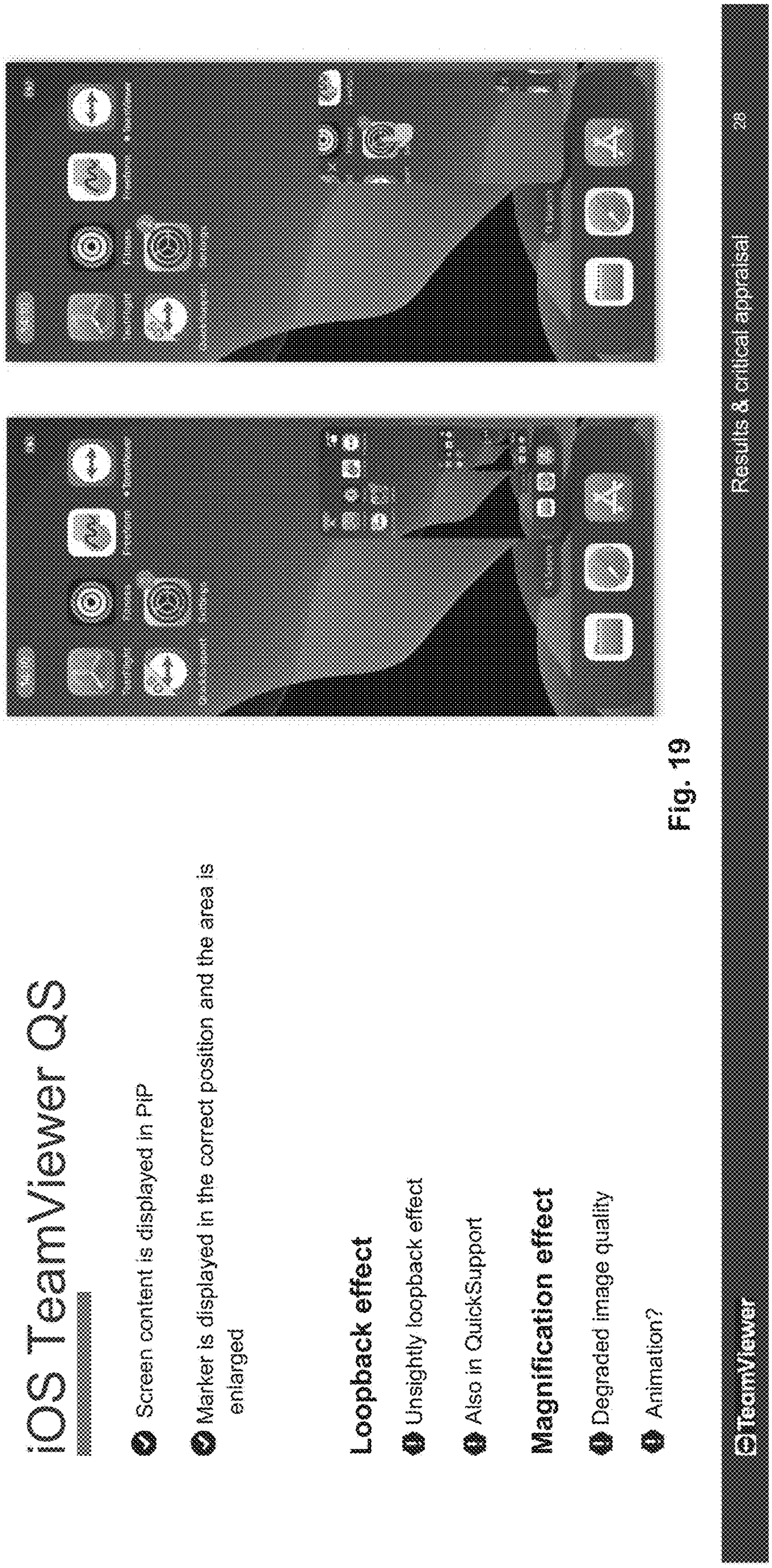
Figure 20:
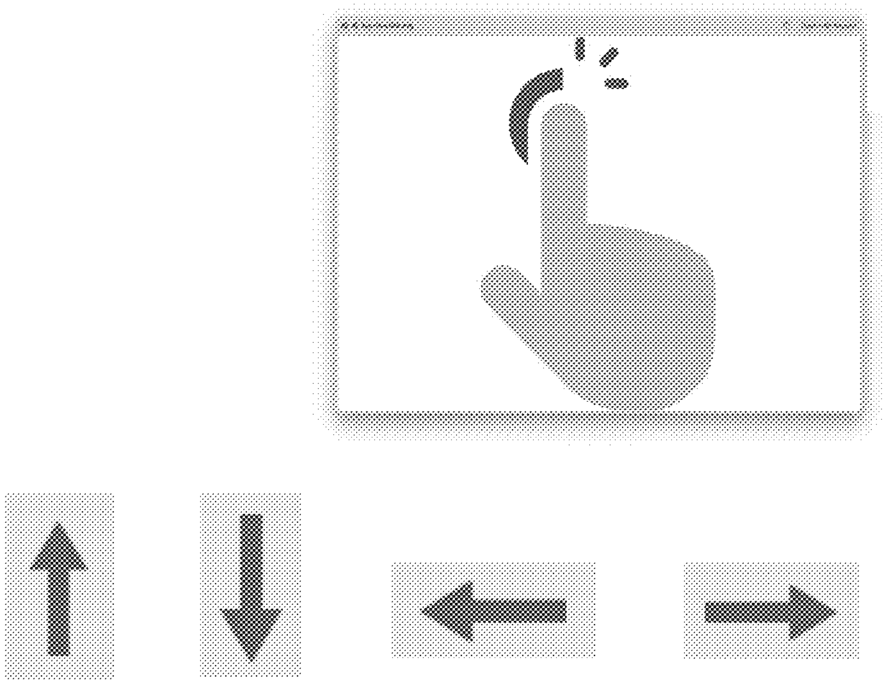
Figure 21:
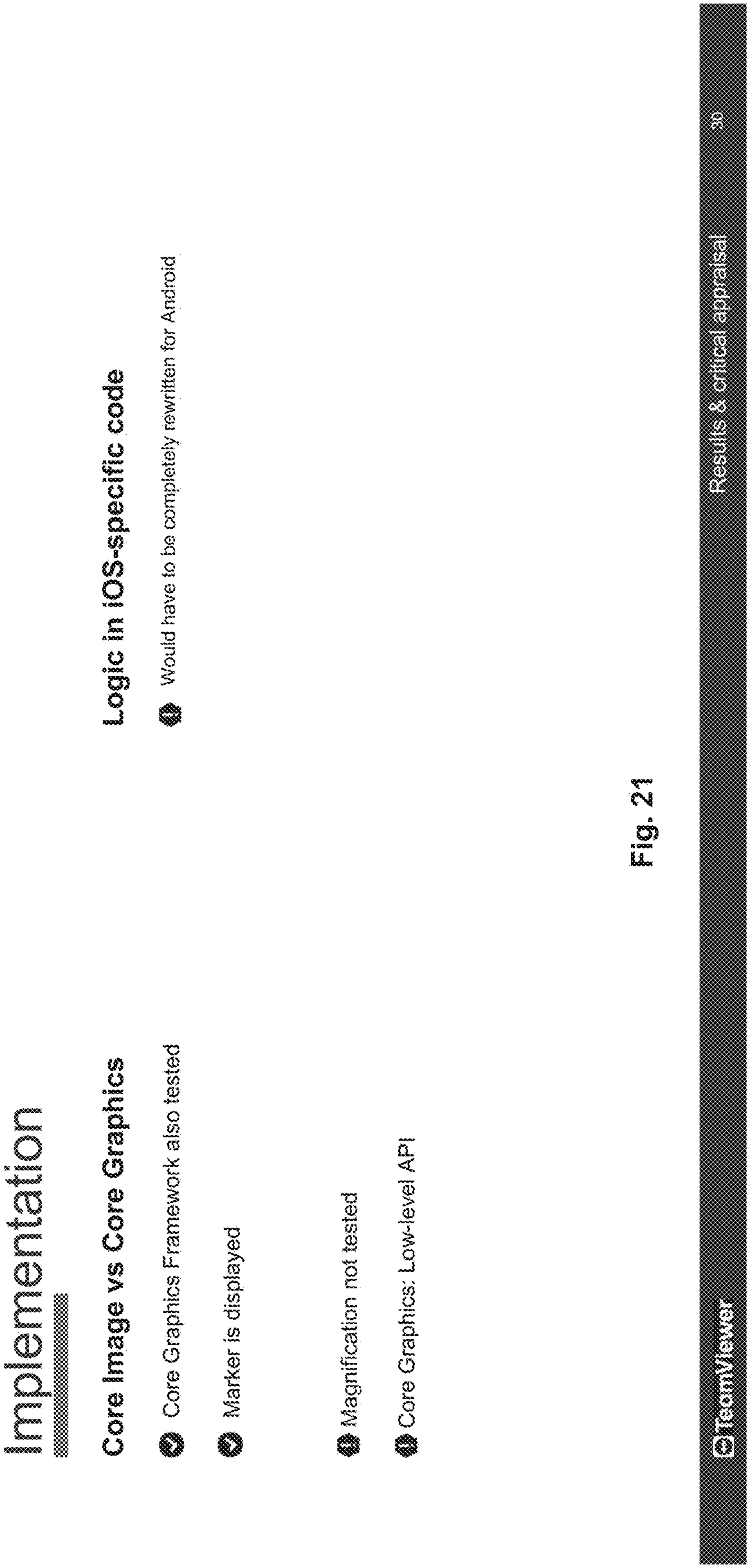
Figure 22:
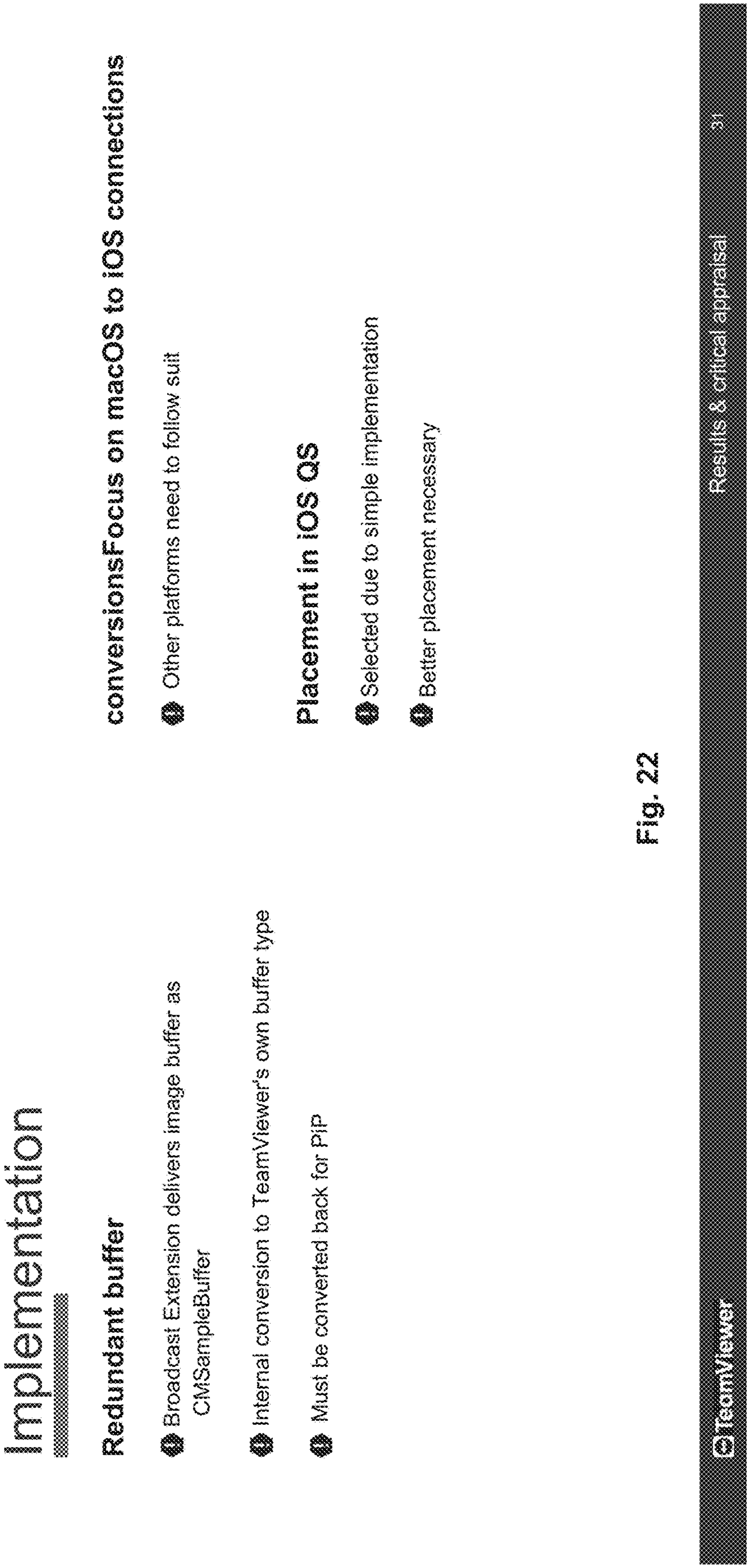
Figure 23:
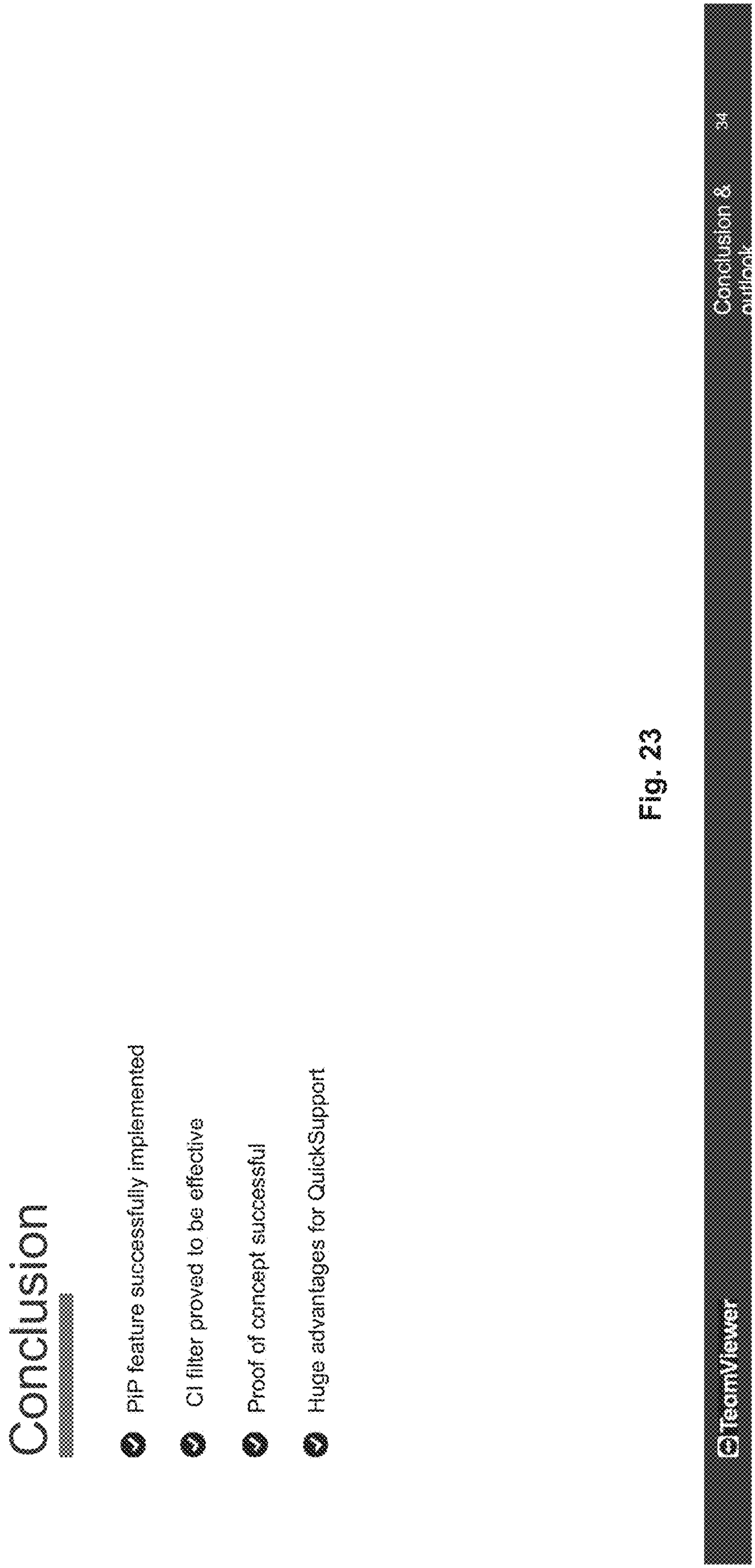

FIG. 3 is a flow diagram that illustrates important steps of the method according to the disclosure.

In a first step S1, content of a remote device screen, such as the remote screen 12 in the embodiment described above, is displayed on a local device screen, such as the local screen 22 in the embodiment described above.

In a second step S2, the user inputs intended for the remote device, such as the table computer 10 in the embodiment described above, are recorded on the locale device, such as the smartphone 12 in the embodiment described above.

In a third step S3, at least part of the content of the remote device screen together with a visual representation of the user inputs recorded on the local device is displayed in an app window, such as the PIP player in the embodiment described above, on the remote device screen.

Further details regarding the inventive concept may be found in an appendix provided as presentation slides shown in FIGS. 4-23.

The invention claimed is:

1. A computer-implemented method for providing remote-support for a remote device with a local device, the computer-implemented method comprising the following steps:

a) providing the remote device having a remote screen;

b) providing the local device having a local screen; and c) providing a remote desktop software configured to provide an app window of the remote desktop software on the remote device, wherein the app window is configured to i) provide a communication channel between the remote device and the local device, ii) transmit at least a part of any content of the remote screen as a remote content via the communication channel from the remote device to the local device and display the remote content on the local screen, iii) receive user inputs on the local device in relation to the remote content to produce augmented remote content, and iv) re-display at least part of the remote content already present on the remote screen as the augmented remote content in the app window on the remote device.

2. The computer-implemented method according to claim 1, wherein a representation of the user inputs received on the local device is re-displayed as the augmented remote content together with the part of the remote content in the app window on the remote device.

3. The computer-implemented method according to claim 2, wherein the representation of the user inputs displayed on the remote device comprises a position marker showing located user inputs.

4. The computer-implemented method according to claim 3, wherein the located user inputs are mouse events and/or touch gestures.

5. The computer-implemented method according to claim 2, wherein the representation of user inputs comprises text representing keyboard inputs from the local device.

6. The computer-implemented method according to claim 1, wherein the app window is a picture-in-picture player partially overlaying the content of the remote screen.

7. The computer-implemented method according to claim 1, wherein (iv) re-display at least part of the remote content on the remote device comprises displaying the augmented remote content in a split-screen configuration together with the remaining content of the remote screen.

8. The computer-implemented method according to claim 1, wherein the remote content re-displayed in the app window is only a partial section of the content of the remote screen and wherein the partial section follows a localized user input received on the local device.

9. The computer-implemented method according to claim 8, wherein the partial section centers the localized user input received from the local device.

10. The computer-implemented method according to claim 8, wherein the partial section executes a smooth and/or delayed movement from a position of origin towards a newly received mouse pointer or touch event position.

11. A computer-implemented method for providing remote-support for a remote device with a local device, the computer-implemented method comprising the following steps:

a) providing the remote device having a remote screen;

b) providing the local device having a local screen; and c) providing a remote desktop software configured to provide an app window of the remote desktop software on the remote device, wherein the app window is configured to i) provide a communication channel between the remote device and the local device, ii) transmit at least a part of any content of the remote screen as a remote content via the communication channel from the remote device to the local device and display the remote content on the local screen, iii) receive user inputs on the local device in relation to the remote content, and iv) re-display at least part of the remote content already present on the remote screen in the app window on the remote device, wherein for transmitting content of the remote screen, a screen region comprising the app window is excluded; and/or a screen region comprising the app window is excluded from the re-displayed remote content.

12. The computer-implemented method according to claim 11, wherein the excluded screen region is replaced with a predefined image.

13. The computer-implemented method according to claim 12, wherein the predefined image is a manufacturer logo.

14. The computer-implemented method according to claim 1, wherein the app window is overlaid semi-transparent over other content of the remote screen.

15. The computer-implemented method according to claim 1, wherein the remote content of the remote screen is transmitted to the local device using screen broadcasting and/or wherein the (iv) re-display of the remote content comprises copying a broadcasting data stream on the remote device, augmenting this broadcasting data stream on the remote device with a representation of the user inputs received from the local device and feeding a resulting data stream including the augmented remote content to the app window.

16. A data processing system comprising:

a remote device having a remote screen;

a local device having a local screen; and a means for carrying out the method of claim 1.

17. A computer program product comprising computer executable instructions recorded in a non-transitory computer readable medium, wherein the computer executable instructions, when executed by a computer, perform the method of claim 1.

18. A non-transitory computer-readable medium, having recorded therein computer executable instructions which, when executed by a computer, perform the method of claim 1.

19. A computer-implemented method for providing remote-support for a remote device with a local device, the computer-implemented method comprising the following steps:

a) providing the remote device having a remote screen;

b) providing the local device having a local screen; and c) providing a remote desktop software configured to provide an app window of the remote desktop software on the remote device, wherein the app window is configured to i) provide a communication channel between the remote device and the local device, ii) transmit at least a part of any content of the remote screen as a remote content via the communication channel from the remote device to the local device and display the remote content on the local screen, iii) receive user inputs on the local device in relation to the remote content to produce augmented remote content, and iv) re-display the augmented remote content in the app window over or next to the remote content on the remote device.

* * * * *